United States Patent
Atkins et al.

(10) Patent No.: US 9,607,658 B2
(45) Date of Patent: Mar. 28, 2017

(54) SYSTEM AND METHODS FOR GENERATING SCENE STABILIZED METADATA

(71) Applicant: DOLBY LABORATORIES LICENSING CORPORATION, San Francisco, CA (US)

(72) Inventors: Robin Atkins, Campbell, CA (US); Raymond Yeung, Los Angeles, CA (US); Sheng Qu, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 14/906,306

(22) PCT Filed: Jul. 28, 2014

(86) PCT No.: PCT/US2014/048387
§ 371 (c)(1),
(2) Date: Jan. 20, 2016

(87) PCT Pub. No.: WO2015/017314
PCT Pub. Date: Feb. 5, 2015

(65) Prior Publication Data
US 2016/0254028 A1    Sep. 1, 2016

(51) Int. Cl.
  *H04N 9/80*    (2006.01)
  *G11B 27/30*   (2006.01)
  (Continued)

(52) U.S. Cl.
  CPC .......... *G11B 27/3027* (2013.01); *G11B 27/28* (2013.01); *G11B 27/34* (2013.01);
  (Continued)

(58) Field of Classification Search
  CPC .......................... G11B 27/3027; G11B 27/28
  (Continued)

(56) References Cited

U.S. PATENT DOCUMENTS 7,826,709 B2   11/2010  Moriya
8,237,864 B2    8/2012  Chung
(Continued)

FOREIGN PATENT DOCUMENTS

CN    101952892    1/2011
EP      1624391    2/2006
(Continued)

OTHER PUBLICATIONS

Zhai, J. et al "A New tone Mapping Workflow for High Dynamic Range Content" IEEE Conference for Visual Media Production, Nov. 12-13, 2009, pp. 91-99.

*Primary Examiner* — Thai Tran
*Assistant Examiner* — Mishawn Hunter

(57) ABSTRACT

Methods and systems for generating and applying scene-stable metadata for a video data stream are disclosed herein. A video data stream is divided or partitioned into scenes and a first set of metadata may be generated for a given scene of video data. The first set of metadata may be any known metadata as a desired function of video content (e.g., luminance). The first set of metadata may be generated on a frame-by-frame basis. In one example, scene-stable metadata may be generated that may be different from the first set of metadata for the scene. The scene-stable metadata may be generated by monitoring a desired feature with the scene and may be used to keep the desired feature within an acceptable range of values. This may help to avoid noticeable and possibly objectionably visual artifacts upon rendering the video data.

15 Claims, 4 Drawing Sheets

(51) Int. Cl.
*H04N 5/14* (2006.01)
*H04N 5/268* (2006.01)
*H04N 5/91* (2006.01)
*G11B 27/28* (2006.01)
*G11B 27/34* (2006.01)
*H04N 9/82* (2006.01)

(52) U.S. Cl.
CPC ............ *H04N 5/147* (2013.01); *H04N 5/268* (2013.01); *H04N 5/91* (2013.01); *H04N 9/8205* (2013.01)

(58) Field of Classification Search
USPC .................................................. 386/239, 241
See application file for complete search history.

(56) References Cited

U.S. PATENT DOCUMENTS

| | | |
|---|---|---|
| 8,478,331 B1 | 7/2013 | Rogers |
| 8,767,004 B2 | 7/2014 | Longhurst |
| 8,891,934 B2 | 11/2014 | Messmer |
| 8,928,686 B2 | 1/2015 | Messmer |
| 8,982,963 B2 | 3/2015 | Gish |
| 9,035,965 B2 | 5/2015 | Longhurst |
| 9,190,014 B2 | 11/2015 | Messmer |
| 9,226,048 B2 | 12/2015 | Messmer |
| 2008/0195977 A1 | 8/2008 | Carroll |
| 2011/0013882 A1 | 1/2011 | Kusunoki |
| 2011/0235720 A1 | 9/2011 | Banterle |
| 2013/0038790 A1 | 2/2013 | Seetzen |
| 2014/0341305 A1 | 11/2014 | Qu |
| 2016/0241829 A1* | 8/2016 | Qu .................. G09G 5/006 |
| 2016/0248939 A1* | 8/2016 | Thurston, III ............ G06T 5/50 |

FOREIGN PATENT DOCUMENTS

| | | |
|---|---|---|
| EP | 2063635 | 5/2009 |
| TW | 2013-04501 | 1/2013 |
| WO | 2009/095733 | 8/2009 |
| WO | 2011/103075 | 8/2011 |
| WO | 2012/166382 | 12/2012 |

* cited by examiner

SYSTEM AND METHODS FOR GENERATING SCENE STABILIZED METADATA

CROSS-REFERENCE TO RELATED APPLICATION

This application claims priority to U.S. Provisional Patent Application No. 61/859,956 filed 30 Jul. 2013 which is hereby incorporated by reference in its entirety.

TECHNICAL FIELD

The present invention relates to video content creation and rendering and, particularly, to systems and methods for generating associated metadata for improving rendering of video data on target displays.

BACKGROUND

Metadata in a video file are typically generated on a per-frame basis or for key frames. However, in many cases, it is possible for video playback to have objectionable artifacts for a viewer of the video content. These artifacts may be noticeable between scenes—e.g., for scenes that may have certain common features. For example, the camera may be capturing video of a single actor who is moving in space and time—e.g., one moment in a darkly lit room and moving to an outdoors sunlit space.

Such a change in ambient conditions may cause noticeable artifacts to a viewer (e.g., changing facial color tones of the aforementioned actor). This may be especially so when the video content is to be displayed on a target display that may have limitations as to its performance—e.g., for luminance, gamut rendering or the like. For a content creator (such as a director or a post-production professional), it may be possible to mitigate such artifacts by generating scene-based metadata.

SUMMARY

Methods and systems for generating and applying scene-stable metadata for a desired video data stream are disclosed herein. Systems and/or method are given wherein a video data stream is divided or partitioned into scenes and a first set of metadata may be generated for a given scene of video data. The first set of metadata may be any known metadata as a desired function of video content (e.g., luminance, color gamut, etc). The first set of metadata may be generated on a frame-by-frame basis. In one embodiment, scene-stable metadata may be generated that may be different from the first set of metadata for the scene. The scene-stable metadata may be generated by monitoring a desired feature with the scene and may be used to keep the desired feature within an acceptable range of values. This may help to avoid noticeable and possibly objectionably visual artifacts upon rendering the video data.

In one embodiment, a method for using scene-stable metadata in a video data stream, the method comprising: dividing the video data stream into a set of scenes; generating a first metadata associated with a first scene within the set of scenes; generating scene stable metadata; and associating the scene stable metadata with said first scene.

In another embodiment, a system for using scene stable metadata to video data, said system comprising: a processor; a memory associated with said processor and said memory further comprising processor-readable instructions, such that when said processor reads the processor-readable instructions, causes the processor to perform the following instructions: receiving a video data streams, said video data stream comprising a set of scenes; for the set of scenes, generating a first metadata associated with the set of scenes; generating a set of scene stable metadata; and for at least one scene, associating a scene stable metadata with said at least one scene.

In yet another embodiment, a video processor comprising: a processor; a memory associated with said processor and said memory further comprising processor-readable instructions, such that when said processor reads the processor-readable instructions, causes the processor to perform the following instructions: receiving an incoming video data stream, said video data stream comprising a set of scenes; receiving a first set of metadata associated with at least one scene; receiving an indication that a scene cut is substantially the next frame of the incoming video data stream; receiving a scene stable metadata; and associating the scene stable metadata with substantially the next frame of the incoming video data stream.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Figure 1:
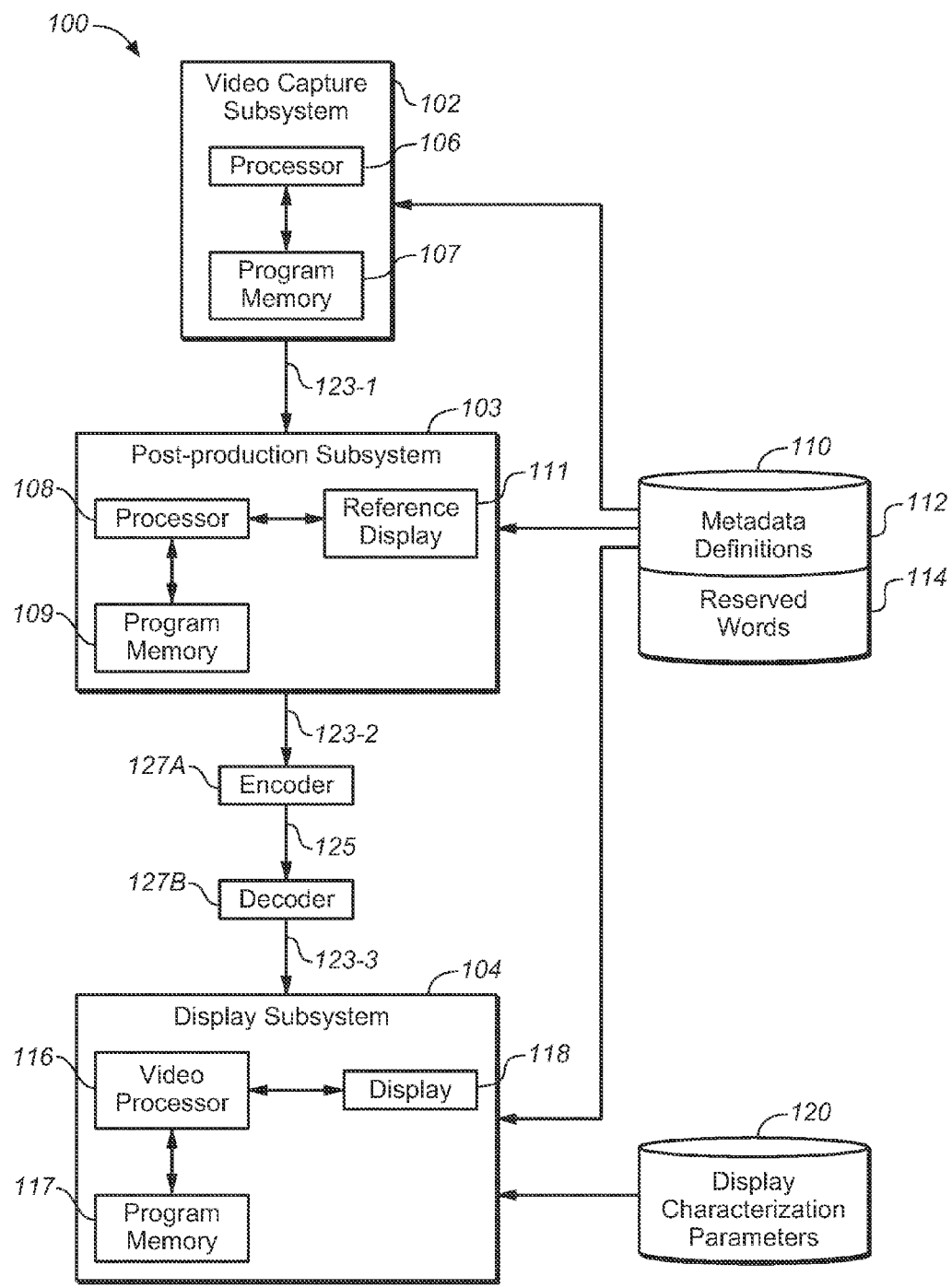
FIG. 1 depicts one embodiment of a environment and architecture of a video pipeline system made in accordance with the principles of the present application.

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. A component may also be intended to refer to a communications-related entity, either hardware, software (e.g., in execution), and/or firmware and may further comprise sufficient wired or wireless hardware to affect communications.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Introduction

To ensure temporal stability (e.g., no flicker, pulsing, fading, etc) and to mitigate potentially disagreeable visual artifact in a video playback on a target display, it may be desired that metadata associated with the video data be generally stable over time. In several embodiments, this may be achieved by enforcing stability on the metadata for the duration of a scene. Such metadata may be allowed to change at each scene cut. In such case, changes in the metadata in adaptation to the content may not be noticeable to a viewer.

For merely one example, it may be possible to estimate the video/image data metadata on a frame-by-frame basis just before display. However, this may result in unpleasant and noticeable changes to the appearance of a scene—possibly, in the middle of a scene.

In several embodiments of the present application, systems and methods for generating or otherwise creating metadata that relates to, and/or is associated with, video data is described herein. In many embodiments of the present application, the associated metadata may be generated on a scene-by-scene basis, as will be described in greater detail herein. Such metadata may be created at the front end of a video data stream—or at any other suitable part of the video data stream. The video data may be transmitted and/or sent to a user/consumer/viewer of the video data—whether that is in a movie theatre, a home viewing environment, video conference, or wherever video data is to be viewed and/or consumed.

Many metadata-generating and/or metadata-consuming techniques are described in the following co-owned patents and/or patent applications:

(1) United States Patent Application 20130076763 to Messmer, published on Mar. 28, 2013 and entitled "TONE AND GAMUT MAPPING METHODS AND APPARATUS";

(2) United States Patent Application 2013016266 to Messmer et al., published on Jun. 27, 2013 and entitled "DATA TRANSMISSION USING OUT-OF-GAMUT COLOR COORDINATES";

(3) United States Patent Application 20130141647 to Longhurst et al., published on Jun. 6, 2013 and entitled "METADATA FOR USE IN COLOR GRADING"; and (4) United States Patent Application 20120315011 to Messmer et al., published on Dec. 13, 2012 and entitled "VIDEO DELIVERY AND CONTROL BY OVERWRITING VIDEO DATA"

all of which are hereby incorporated by reference in their entirety.

Figure 2A:
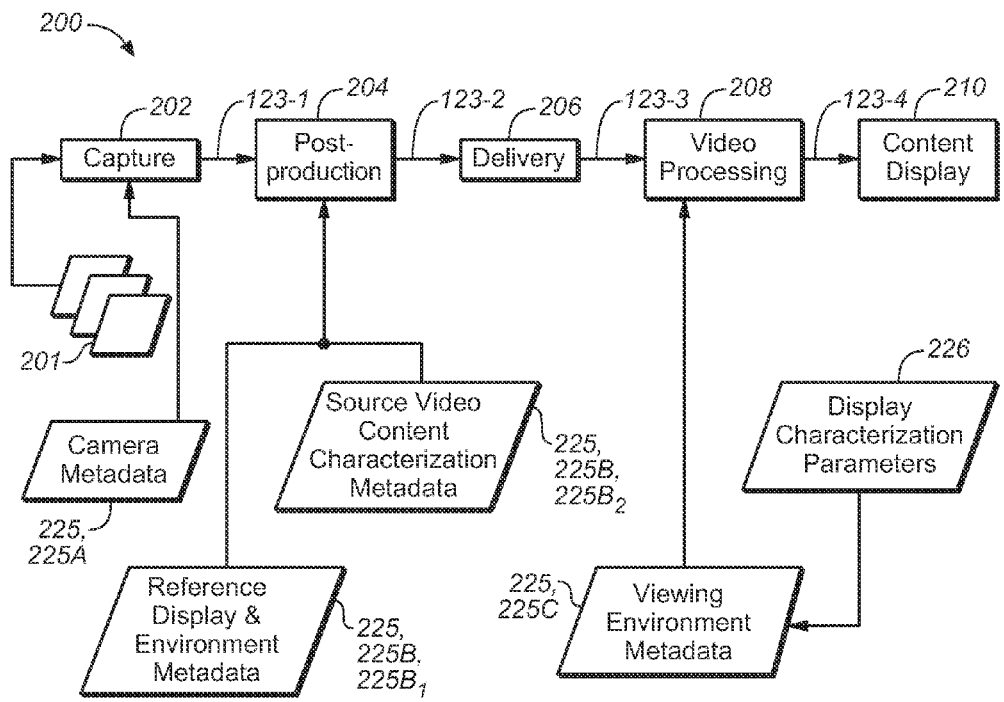
FIGS. 2A and 2B depict two embodiments of video pipeline flowcharts that may be suitable for the purposes of the present application.
Figure 2B:
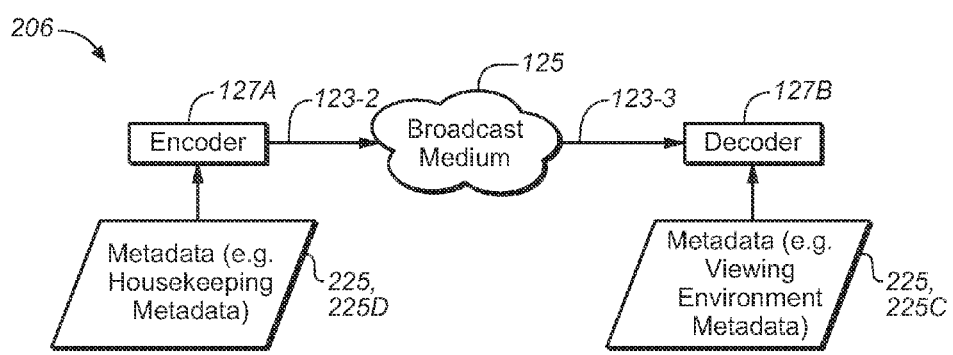

FIGS. 1, 2A and 2B depict several general environmental systems (100, 200, 206, respectively) in which systems and/or methods of the present application may reside. These systems represent possible end-to-end video generation/transmission/viewing video pipelines—e.g., in which video may be captured, scene-by-scene metadata extracted and placed in a video stream for distribution and sent to a target display for viewing.

In FIG. 1, system 100 (or portions thereof) may be configured to perform one or more of the methods described herein. Components of system 100 may be implemented as software, firmware, hardware and/or a combination thereof. System 100 includes a video capture subsystem 102, a post-production subsystem 103 and a display subsystem 104. A stream of video data 123 (more specifically, 123-1, 123-2, 123-3 for different points in the video stream pipeline) is generated by video capture subsystem 102 and is delivered to post-production subsystem 103 for processing and editing. Video images may be displayed and viewed on a reference display 111 of post-production subsystem 103 in the course of editing the video data 123. The edited video data 123 is delivered to display subsystem 104 (over a distribution medium 125 by way of encoder 127A and decoder 127B) for further processing and display. Each of subsystems 102, 103 and 104 (and encoder 127A) may be configured to encode metadata 225 in video data 123. Downstream subsystems may be configured to receive video data 123 from an upstream device and decode the metadata 225 which has been embedded therein. Metadata 225 may be used by downstream subsystems (e.g. subsystems 103 and 104) to guide processing and/or display of video data 123. Metadata 225 may be used by display subsystem 104 along with display characterization parameters 120 to control and/or guide video playback on a display 118 of display subsystem 104.

As seen in FIG. 1, subsystems 102, 103 and 104 may comprise a processor 106, 108 and 116 respectively, and a program memory 107, 109 and 117 accessible to the respective processors. Each processor (here and elsewhere described) may comprise a central processing unit (CPUs), one or more microprocessors, one or more field programmable gate arrays (FPGAs), or any combination thereof, or any other suitable processing unit(s) comprising hardware and/or software capable of functioning as described herein. In each subsystem the processor executes instructions provided by software stored in the program memory. The software may include routines to perform the metadata generation, encoding, decoding and processing steps described herein, such as, for example, routines which:

(1) generate metadata 225 or receive parameters for metadata 225;

(2) encode metadata 225 in video data 123 before such video data is communicated to a downstream device;

(3) decode metadata 225 from video data 123 received from an upstream device;

(4) process and apply metadata 225 to guide processing and/or display of video data;

(5) select a method for encoding metadata 225, based on the image and/or video data 123;

(6) and/or the like.

System 100 may include a repository 110 accessible to subsystems 102, 103 and 104. Repository 110 may include a library of metadata definitions 112 (e.g. which informs the metadata encoders and decoders as to how to generate and/or read the metadata) and a list of reserved words 114 (e.g. protected pixel values or reserved metadata words). The library of metadata definitions 112 may be accessed by subsystems 102, 103 and 104 in generating, encoding and/or processing metadata. In encoding or decoding metadata 225, reserved words 114 may be compared to encoded/decoded metadata bits to identify sequences of guard bits to insert (or that were inserted) in the metadata stream to prevent communication of a reserved word. While a shared repository 110 is shown in the illustrated embodiment of FIG. 1, in other embodiments each of subsystems 102, 103 and 104 may incorporate a local repository 110 stored in a storage medium accessible to that subsystem.

FIG. 2A is a flowchart showing the flow of data through a video delivery pipeline 200 according to a particular embodiment. Video delivery pipeline 200 incorporates similar stages as those depicted in video delivery pipeline 100 of FIG. 1. At one or more stages of video delivery pipeline 200, metadata 225 may be generated and embedded in a stream of video data 123 for use at a downstream stage. Metadata 225 is transmitted along with video data 123 through video delivery pipeline 200 to guide downstream devices in processing the video data and/or to guide video playback at a display subsystem at block 210. Video data 123, including embedded metadata 225, may be delivered to the display subsystem at block 206 using systems, apparatus and methods suitable for the type of video content delivery (e.g. television broadcast over satellite, cable, or high-definition networks; streaming multimedia over IP or wireless networks; playback from DVD or other storage media, etc.).

In the FIG. 2A embodiment, camera metadata 225A may be generated and embedded in video data 123-1 at block 202. Camera metadata 225A may be generated based on the camera settings and video frame capture environment. Camera metadata 225A may comprise, for example, camera parameters which provide a snapshot of the camera settings during video frame capture. Such camera parameters may include aperture (f-stops), lens, shutter speed, sensitivity (ISO ratings) and the like. These camera parameters may be used to guide subsequent steps in video delivery pipeline 200, such as color adjustments (e.g. color timing) during post-production editing at block 204, or display configuration at block 210.

At block 204, post-production metadata 225B is generated and embedded in video data 123-2. Post-production metadata 225B may include: reference display and environment metadata $225B_1$ and source video content characterization metadata $225B_2$. Post-production metadata 225B may be used to guide subsequent steps in video delivery pipeline 200, such as display configuration at block 210.

Reference display and environment metadata $225B_1$ may describe the reference display configuration and studio or viewing environment used in the block 204 post-production editing. For example, with respect to the reference display used to display video data 123 during the block 204 post-production editing, reference display and environment metadata $225B_1$ may include parameters such as:

(1) a 3D color gamut mapping describing the tone and gamut boundaries of the reference display at a detailed resolution;
(2) a reduced set of parameters defining the tone and gamut boundaries of the reference display (which may be used to estimate a 3D color gamut mapping);
(3) system tonal response parameters describing the tonal response of the reference display for each chrominance channel;
(4) the screen size
(5) and/or the like.

Reference display and environment metadata $225B_1$ may also include parameters describing the studio environment in which video content was color-timed or edited on a reference display during the block 204 post-production editing. Such parameters may include ambient luminance and ambient color temperature.

Source video content characterization metadata $225B_2$ may describe post-production edited video content including information which may identify or provide:

(1) tone mapping (e.g. customized tone mapping parameters or curves which may be used to guide tone expansion at the display); and gamut mapping (e.g. customized gamut mapping parameters which may be used to guide gamut expansion at the display);
(2) the level of the minimum black level deemed important in the scene (e.g., the shadow under a car);
(3) the level corresponding to the most significant portion of an scene (e.g., an actor's face);
(4) the level of the maximum white level deemed important in the scene (e.g., the center of a light bulb);
(5) the most chromatic color in the scene (e.g., neon light, etc);
(6) a location map of light sources in an image, or of reflective or emissive objects in an image;
(7) gamut of the video source content;
(8) areas of an image which are color-timed purposely out of gamut of the reference display;
(9) protected colors that should not be altered during pre-display processing by the video processor or during display configuration;
(10) an image histogram characterizing the image in terms of luminance or gamut (for example, such information may be used by downstream devices to determine average luminance to refine tone and gamut mapping);
(11) a scene change or reset flag, to alert downstream devices that any statistics or hysteresis from previous video frames are no longer valid;
(12) a motion map characterizing the video content to identify objects in motion, which may be used by downstream devices in combination with the light source location map to guide tone and gamut mapping;
(13) an indication of the source of color-timed content (e.g. direct from the camera, or post-production editing);
(14) director's creative intent settings which may be used to control downstream devices such as a decoder/television or other display. For example, such settings may include: display mode control providing the ability to control the display to operate in a particular mode (e.g. vivid, cinema, standard, professional, etc.); content type (e.g. animation, drama, sports, games, etc.) which may be used to determine an appropriate gamut or tone mapping or the like;
(15) and/or the like.

Video data 123-2 is delivered to a display subsystem at block 206. As seen in FIG. 2B, delivery pipeline 206 may include an encoder stage 127A for driving distribution, broadcast or transmission of video data 123 over a video distribution medium 125 such as satellite, cable, or high-definition networks; IP or wireless networks; or DVD or other storage media, etc. A decoder stage 127B may be provided at the display end of block 206 to decode video data 123 distributed over medium 125. Decoder stage 127B may be implemented by a set-top box, for example, or by a decoder within the display subsystem. At blocks 206 and/or 208, viewing environment metadata 225C and/or other metadata 225 may be embedded in video data 123. Viewing environment metadata 225C may comprise, for example:

Advanced Video Coding (AVC) VDR encoder data providing reference monitor tone mapping or gamut curves or ambient luminance of the reference environment. At least some of this information may be determined by the video processor with knowledge of the display characteristics (e.g. by reading the Extended Display Identification Data (EDID) of the display) and environment of the display subsystem. In some embodiments, at least some of this information may be determined at the studio during post-production processing of the video data.

Parameters describing the environment in which the display of the display subsystem is situated. Such parameters may include, for example, ambient luminance and/or tone or color temperature.

Viewing environment metadata 225C may be used to guide processing of video data at block 208 and/or display configuration at block 210.

The display subsystem comprises a video processor for processing incoming video data 123-3 at block 208. The video processor of the display subsystem may perform signal processing on video data 123-3 based on metadata 225 extracted from video data 123 (e.g. metadata 225A) and/or known display characteristics associated with the display of the display subsystem. Video data 123 may be processed and adjusted for the display in accordance with display characterization parameters 226 and/or metadata 225.

Other metadata 225 that may be embedded in video data 123 at blocks 206 and/or 208, or at other stages of video delivery pipeline 200, includes housekeeping metadata 225D (for managing distribution rights and the like) such as, for example:
(1) watermarking data indicating where the video content was generated, distributed, modified, etc.;
(2) fingerprinting data providing a description of the video content for searching or indexing purposes, and the like;
(3) protection data indicating who owns the video content and/or who has access to it;
(4) and/or the like.

Viewing environment metadata 225C may be generated based at least in part on display characterization parameters 206 associated with the display of the display subsystem. In some embodiments, viewing environment metadata 225C, source video content characterization metadata 225B$_2$ and/or housekeeping metadata 225D may be created or provided by analysis of video data 103 at the encoder stage 127A, the decoder stage 127B and/or by the video processor at block 208.

At block 210, display configuration may be performed on a display of the display subsystem. Appropriate parameters for display configuration may be determined based on display characterization parameters 226 and/or metadata 225, such as camera metadata 225A, post-production metadata 225B (including reference display and environment metadata 225B$_1$ and source video content characterization metadata 225B$_2$) and viewing environment metadata 225C. The display is configured in accordance with such parameters. Video data 123 is output to the display.

Metadata 225 that is used for processing of video data 123 at block 208 and display configuration at block 210 is delivered in the video data stream so that metadata 225 is received at the display subsystem (including the video processor and display) prior to its application. In some embodiments, metadata 225 is delivered so that it is received by the display subsystem at least one video frame ahead of the frame at which the metadata 225 is to be applied. In certain embodiments, metadata 225 is delivered one video frame ahead and application of metadata 225 at blocks 208 and/or 210 may be triggered upon detection of a new video frame in the incoming video stream.

Scene-by-Scene "Stable" Metadata

As previously mentioned, it may be desirable to capture metadata in a video file on a scene-by-scene basis. As described herein, several embodiments of the present application may capture metadata (e.g., based on luminance, color gamut or the like) on a scene-by-scene basis. In particular, one embodiment may provide a set of "stable" metadata that may be applied across same and/or similar scenes.

In one embodiment, each scene may be associated with global scene metadata that may be generated in response to frame-dependent characteristics within a scene—e.g., such as the min, max, and mid. luminance values in each frame. Scenes with similar characteristics may also be forced to share the same metadata, so that during display they maintain the same look and feel. In another embodiment, a receiver may also receive "advanced notice metadata"—e.g., that is, metadata for a future scene, so it may prepare, in advance, parameters related to DM processing.

To appreciate the concept of "stable" scene metadata, the following descriptions are offered for merely expository purposes and not meant to limit the scope of the present application. It may be desirable to have color and brightness stable over the course of a few scenes. In one example, suppose there are two actors in a "scene" but the camera cuts to one actor and then the other actor in a sequence of video frames—e.g., in an extended dialog between the two actors on one set. Even though this may constitute a "scene" theatrically, the two different camera cuts may cause color and/or luminance shift that may be both noticeable and objectionable to the viewer. In some embodiments, it may be possible to have different metadata for each cut—e.g., in order to produce a stable appearance of the entire scene.

For another example, consider if there is a single actor in a "scene"—but the actor is on the move and the camera follows the actor. Again, even though this may be a single scene theatrically, there may be luminance and/or color shifts that are both noticeable and/or objectionable to the viewer. For yet another example, the director may utilize a "dissolve" (or "cross-fade") technique in which one scene reduces its luminance (perhaps to zero), while another scene may start from low (e.g, zero) luminance to maximum luminance over the period of a few frames. Such dissolves or cross-fades may be used to illustrate a flashback for an actor on screen or for other purposes.

These situations may become relevant in cases in which a director may be engaged in post-production processing of captured video. Such a director may be color grading, luminance mapping the video on a professional grade monitor—e.g., having on the order up to 5000 nits luminance. However, a film may be viewed on a home video set or some other target display) that may have much lower luminance. Knowing this in advance may allow a director or other content creator the opportunity to improve the viewer's experience of the content.

Based on these few examples (as well as others not mentioned herein), it may be desirable from a viewer's perspective (if not the video's content creator/director's perspective) to apply metadata on a scene-by-scene basis and/or have a process in place that may determine when to apply "stable" metadata to a scene and/or sequence of frames—which might have employed different, perhaps frame-based metadata to the current scene/frame.

For a home video situation, it may often be the case that there is a Display Management (DM) processor that may seek to provide a "best" (or "better") mapping of the video data to the home display. Often, DM's provide a dynamic range mapping to provide a good luminance matching to the target display from the available video data. Dynamic range mapping may use luminance statistics-based metadata—e.g., maximum luminance, mean luminance and/or minimum luminance to provide for the mapping.

Several co-owned patent applications disclose Display Management (DM) systems and techniques and may be useful for the systems and methods of the present application:

(1) United States Patent Application 20110194618 to Gish et al., published on Aug. 11, 2011 and entitled "COMPATIBLE COMPRESSION OF HIGH DYNAMIC RANGE, VISUAL DYNAMIC RANGE, AND WIDE COLOR GAMUT VIDEO";

(2) United States Patent Application 20120229495 to Longhurst, published on Sep. 13, 2012 and entitled "INTERPOLATION OF COLOR GAMUT FOR DISPLAY ON TARGET DISPLAY";

(3) United States Patent Application 20120321273 to Messmer, published on Dec. 20, 2012 and entitled "VIDEO DISPLAY CONTROL USING EMBEDDED METADATA"; and (4) United States Patent Application 20130038790 to Seetzen et al., published on Feb. 14, 2013 and entitled "DISPLAY MANAGEMENT METHODS AND APPARATUS";

all of which are hereby incorporated by reference in their entirety.

One Embodiment of Stable Scene Metadata

Figure 3:
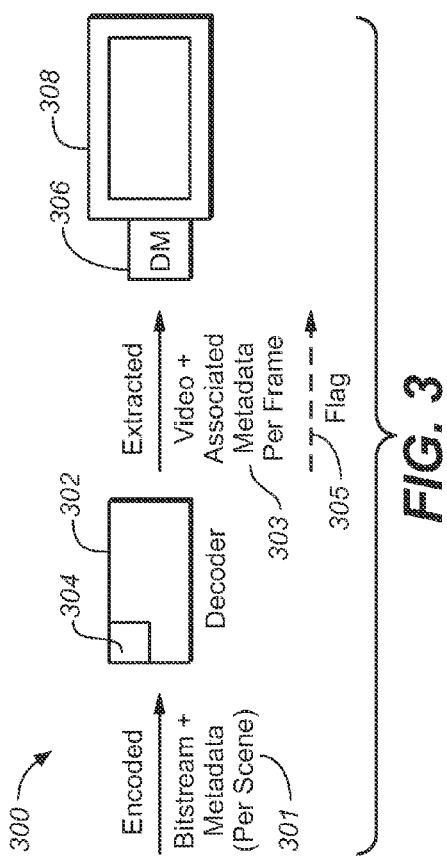
FIG. 3 depicts one embodiment of a high level flow diagram of the video processing that may occur at the display management of an exemplary target display.

FIG. 3 depicts one embodiment of a high-level block flow diagram of the present application. Video pipeline 300 may receive an encoded bit stream 301 that may further comprise the video/image data, together with metadata that may be in some useable format—e.g. frame-by-frame, scene-by-scene and comprising luminance statistical based metadata, color mapping metadata or the like.

This encoded bit stream 301 may be received by a decoder 302, which may further comprise a parser 304. Decoder 302 may decode the incoming bit stream, which may be encrypted, compressed or otherwise encoded in any manner known in the art. Once decoded, the incoming bit stream may be parsed by a parser 304. Parser 304 may split out the metadata from the video/image data.

The extracted video/image data may be sent forth, together with its associated metadata as an intermediate bit stream 303. Bit stream 303 may also comprise one or more flags (or some other indication, signal or the like) 305 that may inform the downstream processor(s) what metadata to apply or the like, as will be described further herein.

The intermediate bit stream 303 and/or any flags 305 may be received by a Display Management (DM) module 306. DM module 306 may apply any desirable image/video mapping before the final image/video data is sent to the target display 308. Target display 308 may be any suitable device that may display an image and/or video data to a viewer. For merely some examples, such target displays 308 may be HD televisions, movie projectors, desktop monitors, laptops, tablet, smart devices or the like.

As mentioned, several embodiments of the present application may involve the calculation and/or derivation of scene-by-scene metadata—e.g., possibly a set of "stable" scene metadata. Such stable scene metadata may be employed judiciously by the pipeline during a time when stable scene metadata may be employed (possibly substituting other available metadata whether scene-based or frame-based) to mitigate possible noticeable and/or objectionable artifacts to the viewer.

For merely one example, consider a scene in a dark cave. The image might show all the dark detail of the cave. However, if the camera pans across to the opening of the cave (which is bright), an adaptive mapping may adjust the image accordingly—e.g., which may lower the dark detail of the cave walls to accommodate the new brighter pixels. With generation and use of scene-stable metadata, the mapping may be optimized for the entire scene—e.g., so there would not be a noticeable change mid-scene.

Figure 4:
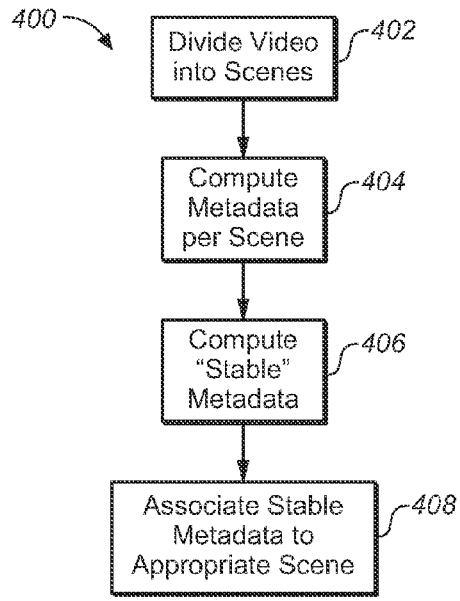
FIG. 4 is one embodiment of video processing for the generation and association of scene-stable metadata for a video file.

FIG. 4 is one embodiment of a high-level flow chart 400 of stable scene metadata processing. At 402, video data may be divided into a set of scenes. This division and/or partitioning of a video into a set of scenes may be accomplished in a number of ways. First, the partitioning may be made by a human user—e.g., a director, film editor, someone in post-production or the like. For example, in one embodiment, the scene cuts may be already known from the Edit Decision List (EDL)—which may be used to create the movie from a number of different shots. It is possible in one embodiment, to extract that EDL and use it to deliminate the scene boundaries. This way, there is little or no extra effort required. In addition, the user has the option to overwrite the automatically determined (or extracted) scene cuts.

Alternatively, the identification of scene partitioning may be done automatically by a video processor that may make such determinations by analyzing video data on a frame-by-frame basis. For example, if there is a measurably large variation of luminance data, color data or other image data metric between frames, then a video processor may decide that this difference may mark the boundary of two scenes. Such automatic determination may be enhanced in a look-ahead, or multi-pass process—whereby several frames may be analyzed and, if an initial difference of an image data metric is noted, and if that metric in many frames thereafter substantially conform with such initial difference, then a high degree of probability may be assessed that a scene change has occurred.

For purposes of the present application, scenes may be identified in the video data in any manner known. At 404, metadata may be computed, measured or otherwise extracted on a scene-by-scene basis. Just for one example, if there are 50 frames that comprise a given scene, then luminance data may be measured and extracted for the entire scene. Scene metadata, such as minimum luminance, mean and/or average luminance and maximum luminance may be calculated. Other image/video metrics may be likewise measured and/or extracted to form other scene-based metadata.

The following is one embodiment of generating scene stable metadata within a video stream:

(1) The MIN, MID, and MAX luminance is computed for each frame within a scene. The results are then combined for the entire scene.

a. For MIN, take the minimum of all the minimums of all frames in a scene;

b. For MID, take the mid (Average) of all the mids of all the frames in a scene;

c. For MAX, we take the maximum of all the maximums of all the frames in a scene.

It will be appreciated that similar statistics may be derived for other video/image metrics—e.g., color gamut data or the like. In another embodiment, it may be possible to generate other scene-dependent metadata—e.g., how much sharpening or smoothing to apply to the image data within a scene.

At 406, a set of "stable" metadata may be computed for a scene. The stable metadata may differ from an earlier computed scene-based (or frame-based) metadata—depending upon the use of such metadata. Scene stable metadata may be computed and/or generated for a scene, possibly according to some monitored feature, aspect and/or metric that may be potentially produce a noticeable and/or objectionable change in the video data—e.g., even if the earlier computed scene-based metadata were to be used in rendering the scene for viewing. For example, in the case of one actor moving in space and time across a different background (e.g., going from a dark enclosed room to bright outdoors sunlit setting in one cut) may produce noticeable and/or objectionable changes in color or tint in the actor's face or otherwise skin tone. In some embodiment, metadata for a second scene may also be replaced by the metadata computed for a first scene (e.g., different than second scene) if according to a monitored feature, aspect, and/or metric the two scenes may be considered to be perceptually similar. The second scene may be subsequent or prior to the first scene.

Other features, aspects and/or metrics are possible—e.g., skin tone, luminant features/objects, dark features/objects, colored features/objects and the like. Such changes may be mitigated with stable scene metadata. Scene stable metadata may be computed and/or generated such that the feature, aspect and/or metric being monitored over the course of a scene is brought back into and/or kept within a range of acceptable values. At 408, the process may associate and/or substitute this stable scene metadata for any other metadata that may or may not be previously associated with the scene. This association and/or substitution of stable scene metadata may be provided to bring back such features, aspects and/or metrics to within an acceptable range—e.g., possibly if other metadata allows such features, aspects and/or metrics to go out of acceptable range. The range of acceptable values for a feature, aspect and/or metric may be determined manually (e.g., by a director and/or film editor), or according to certain rules and/or heuristics involving image processing/rendering and/or film editing.

It should be appreciated that the processing set forth in FIG. 4 may occur at many different points in the video/image pipeline. For example, the partitioning of video into scenes may be done in post-production by a human—or elsewhere by a processor in the pipeline. In addition then computation and/or extraction of scene-based metadata may be done in post-production or elsewhere in the pipeline. Likewise, the association of "stable" scene metadata may occur in post-production—or may be accomplished further downstream, e.g., by the DM or other video processor prior to sending the final video/image data to the target display for rendering.

Alternative Embodiments

In some embodiments, the mapping operations may be image-content dependent in order to achieve maximum performance. Such image-dependent mapping may be controlled by metadata which is generated from the source content. To ensure temporal stability (e.g., no flicker, pulsing, fading, etc.) it may be desirable that the metadata is generally stable over time. In one embodiment, this may be affected by enforcing stability on the metadata for the duration of a scene. The metadata may be allowed to change at each scene cut. A sudden change in metadata in adaptation to the content may not be noticeable to a viewer in such a case.

In one embodiment, the steps for generating scene-stable metadata may comprises the following:
(1) Acquire location of scene cuts in the video data. In one embodiment, this may be derived from the Edit Decision List (EDL). Alternately, this can be manually entered by a human—or detected automatically by a processor.
(2) Compute and/or generate the metadata for each frame in the scene:
   a. Optionally downsample the image. (This may tend to speed up processing and minimizes the effect of a few outlying pixel values.)
   b. Convert image into desired color space (e.g., IPT-PQ)
   c. Compute the minimum value of the image (e.g, I channel)
   d. Compute the maximum value of the image (e.g., I channel)
   e. Compute the mean value of the image (e.g., I channel)
(3) Combine the per-frame results into a per-scene result:
   a. Compute the minimum of each of the frame minimums.
   b. Compute the maximum of each of the frame maximums.
   c. Compute the mean of each of the frame means.
(4) Associate the metadata with the scene—or alternately each frame within the scene It will be appreciated that variations of the above embodiments are possible and are contemplated under the scope of this present application. For example, instead of analyzing each frame of the scene in step (2), a single representative frame may be chosen and used to compute and/or generate metadata, which is then associated with the entire scene.

In addition, cross-fades may be supported by indicating the metadata for the scenes on either side of the cross fade, and then interpolating for the intermediate frames. Such interpolation may be linear or asymptote at both ends via a cosine or similar function.

After step (4), the metadata may be inserted into an encoded bit stream with appropriate synchronization with the correct video frame. The metadata may be repeated regularly to allow random entry into the stream.

In yet another embodiment, it is possible to include in the metadata some pre-computed values to help with converting the decoded video into a desired color space (e.g., IPT-PQ). This may be desirable since the conversion is often done on devices with fixed-point processors, which may not do well with certain mathematical operations such as divides and exponents. The use of pre-computed values and embedding them in the metadata stream may be of benefit.

Decoding the Scene-Stabilized Metadata/"Advanced Notice" Metadata

At a video decoder, new scene metadata may arrive in the same frame as the first frame of a new scene. Alternately, the metadata may arrive before the first frame of the scene in order to provide time for decoding and interpreting the metadata in time for it to be applied for processing the video. This "advanced notice metadata" and other techniques may be desirable for improving the scene-stabilized metadata's robustness over bit stream transmission. Several improvements may comprise the following, as either individual improvements or several improvements in combination:
(1) Repeat the metadata every frame within a same scene;
(2) Add an indicator/flag of a scene cut taking place at substantially the next frame in metadata body;
(3) Add an indicator/flag of a scene cut taking place at the current frame in metadata body;
(4) Add an indicator/flag that the next frame's metadata is substantially identical to (or substantially different from) the current frame's metadata; and/or
(5) Add data integrity field in metadata body for error checking (e.g. CRC32).

Figure 5:
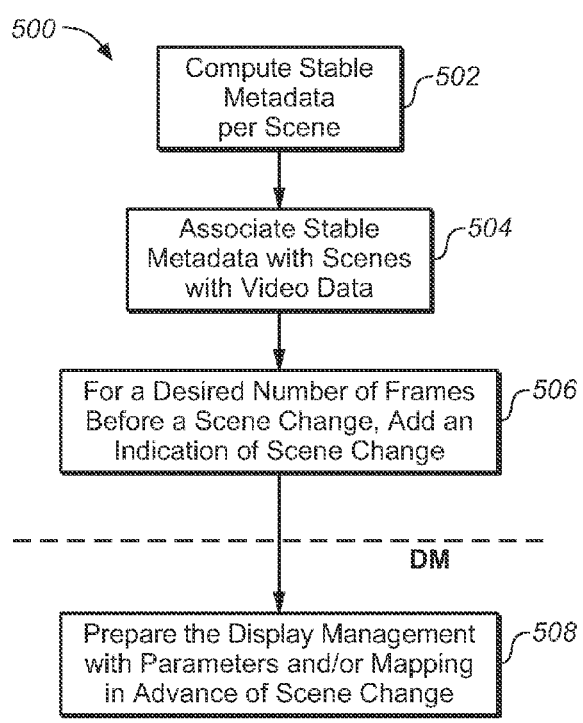
FIG. 5 is one embodiment of a flow chart that incorporates advanced notice of scene changes in a video pipeline.

FIG. 5 depicts one embodiment of such advanced notice metadata flow chart 500. At 502, the system/pipeline may compute and/or generate the metadata on a per-scene basis. This metadata—stable scene metadata or otherwise—may be associated with the scene in the video data bit stream at 504. The system/pipeline may then add an indication of an impending scene change in advance by a desired (e.g., one or more) number of frames prior to the actual first frame of the new scene at 506. This indication and/or flag may comprise a part of the bit stream and noticed by the DM (or other suitable processor in the pipeline). At 508, the system may allow the DM (or other suitable processor) time to install parameters and/or mappings in advance of the scene change. This additional time may allow the system an opportunity to avoid any noticeable artifact that may be objectionable to a viewer of the video content.

This may tend to be an improvement over conventional methods of stabilizing metadata which may not have access to the locations of scene cuts ahead of time. For example, if the scene cuts are not known ahead of time, metadata may be estimated on the fly by analysis of the video data, or allowing metadata to change smoothly over time. This may cause image artifacts such as flickering, pulsing, fading, etc. In another embodiment, by computing the metadata at the source (e.g., before video compression), it may be possible to reduce the computations and hence cost required by less capable consumer devices.

Figure 6:
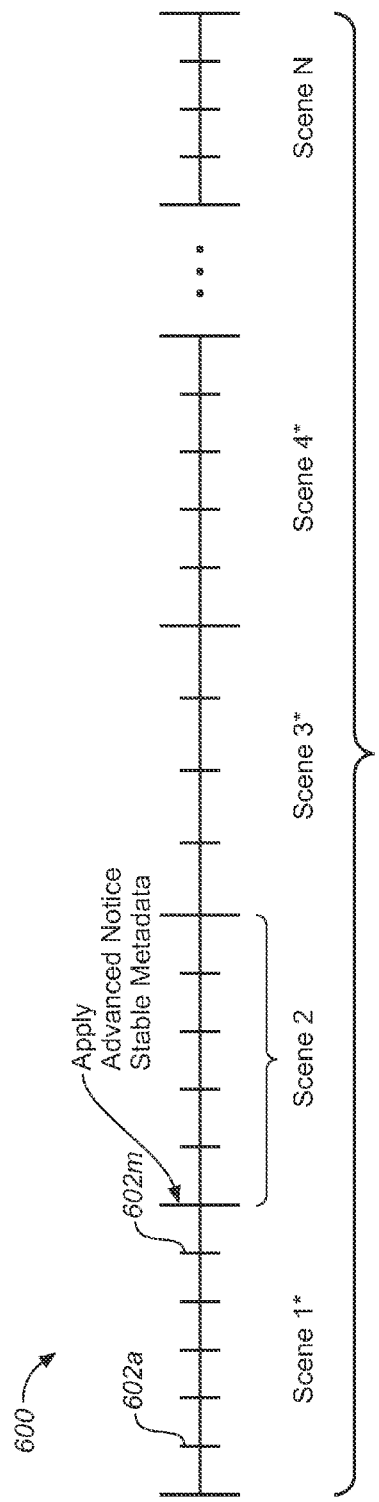
FIG. 6 depicts one exemplary video file, partitioned into scenes and one frame within a scene comprising an indication of scene change.

FIG. 6 is one example of a video data 600 that is partitioned into a number of scenes (Scene 1 through Scene N)—which in turn comprises a number of frames (e.g., frame 602a). Frame 602m of Scene 1 may have an advance notice flag associated with the frame—such that the DM may have time to set parameters and/or mapping to better render Scene 2, which follows in turn.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

What is claimed is:

1. A method for using scene-stable metadata in a video data stream, the method comprising:
   dividing the video data stream into a set of scenes;
   generating a first metadata associated with a first scene within the set of scenes, wherein generating the first metadata associated with the first scene within the set of scenes comprises:
      computing a min, mid and max luminance for each frame in a scene; and
      computing a min, mid and max luminance for the scene;
   generating scene stable metadata using computed min, mid, or max luminance for each frame in a scene; and
   associating the scene stable metadata with said first scene, wherein associating the scene stable metadata with said first scene further comprises:
      repeating the scene stable metadata for every frame within said first scene.

2. The method of claim 1 wherein dividing a video data stream into a set of scenes further comprises:
   deriving the location of scene cuts from an edit decision list.

3. The method of claim 2 wherein deriving the location of scene cuts from the edit decision list further comprises:
   deriving the location of scene cuts manually or automatically by a processor.

4. The method of claim 1 wherein generating the scene stable metadata further comprises:
   monitoring a feature within a scene to determine the scene stable metadata for the scene.

5. The method of claim 4 wherein generating scene stable metadata further comprises:
   computing the scene stable metadata such that the monitored feature within a scene is kept within a range of acceptable values.

6. The method of claim 5 wherein said monitored feature is one of a group, said group comprising: skin tone, luminant features, dark features and colored features.

7. The method of claim 6 wherein associating the scene stable metadata with said first scene further comprises:
   associating the scene stable metadata with said first scene, wherein said scene stable metadata is different from said first metadata generated for said first scene.

8. The method of claim 6 wherein associating the scene stable metadata with said first scene further comprises:
   associating the scene stable metadata with said first scene if said scene stable metadata keeps the monitored feature within said first scene within an acceptable range of values.

9. The method of claim 1 wherein associating the scene stable metadata with said first scene further comprises:
   adding an indication of a scene cut in the current frame or in the next frame.

10. The method of claim 1 wherein associating the scene stable metadata with said first scene further comprises:
    adding an indication that the metadata of the next frame is substantially identical or substantially different to the metadata of the current frame.

11. The method of claim 1 wherein associating the scene stable metadata with said first scene further comprises:
    adding a data integrity field in the metadata for error checking.

12. A system for using scene stable metadata to video data, said system comprising:
    a processor;
    a memory associated with said processor and said memory further comprising processor-readable instructions, such that when said processor reads the processor-readable instructions, causes the processor to perform the following instructions:
    receiving a video data stream, said video data stream comprising a set of scenes;
    generating a first metadata associated with a first scene within the set of scenes, wherein generating the first metadata associated with the first scene within the set of scenes comprises:
       computing a min, mid and max luminance for each frame in a scene; and
       computing a min, mid and max luminance for the scene;
    generating scene stable metadata using computed min, mid, or max luminance for each frame in a scene; and
    associating the scene stable metadata with said first scene, wherein associating the scene stable metadata with said first scene further comprises:

repeating the scene stable metadata for every frame within said first scene.

13. The system of claim 12 wherein the instructions of generating scene stable metadata further comprises:
monitoring a feature within a scene to determine the scene stable metadata for the scene.

14. The system of claim 13 wherein the instruction of generating scene stable metadata further comprises:
computing a scene stable metadata such that the monitored feature within a scene is kept within a range of acceptable values.

15. The system of claim 14 wherein said monitored feature is one of a group, said group comprising: skin tone, luminant features, dark features and colored features.

\* \* \* \* \*